United States Patent [19]

Howe

[11] Patent Number: 5,115,012
[45] Date of Patent: May 19, 1992

[54] THERMOPLASTIC BLOW MOLDABLE POLYESTER COMPOSITIONS

[75] Inventor: King L. Howe, Wilmington, Del.

[73] Assignee: E. I. du Pont de Nemours and Company, Wilmington, Del.

[21] Appl. No.: 539,648

[22] Filed: Jun. 18, 1990

[51] Int. Cl.$^5$ ............................................. C08L 67/02
[52] U.S. Cl. .................................... 524/456; 524/505; 524/513; 525/92; 525/166; 525/176
[58] Field of Search ............... 525/166, 92; 524/456, 524/505, 513

[56] References Cited

U.S. PATENT DOCUMENTS

| | | |
|---|---|---|
| 3,673,139 | 6/1972 | Hrach ................................... 525/177 |
| 4,034,013 | 7/1977 | Lane . |
| 4,246,378 | 1/1981 | Kometani et al. . |
| 4,659,757 | 4/1987 | Okamoto et al. . |
| 4,753,980 | 1/1988 | Deyrup . |
| 4,912,167 | 3/1990 | Deyrup et al. . |
| 4,914,152 | 4/1990 | Miyashita ............................ 525/68 |
| 4,914,156 | 4/1990 | Howe . |

FOREIGN PATENT DOCUMENTS 59-184251 10/1984 Japan .

*Primary Examiner*—Patricia Short

[57] ABSTRACT

Semi-crystalline blow moldable polyester compositions formed by melt blending a polyester, an ethylene copolymer containing epoxide groups, a methyl methacrylate copolymer containing epoxide groups, an ionomer obtained by neutralizing with Na+ or K+ and optionally another polyester.

23 Claims, No Drawings

THERMOPLASTIC BLOW MOLDABLE POLYESTER COMPOSITIONS

BACKGROUND OF THE INVENTION

Polyesters that are semicrystalline particularly poly(butylene terphthalate) PBT, and poly(ethylene terephthalate) PET, are used extensively in many applications that require good solvent resistance and good properties at elevated temperatures. They are ordinarily processed by injection molding, but there are many components of automobiles and other systems wherein such parts are hollow and to manufacture these by injection molding is very difficult and expensive. Many such parts can conceivably be made by blow molding provided the polymer system has adequate melt strength and melt viscosity and yields smooth high quality surfaces in the blow molded parts. Unfortunately, polyesters commercially available for injection molding and extrusion have melt viscosities which are too low to make them suitable for extrusion blow molding. It would be desirable to have blow moldable polyester compositions which provide moldings having smooth surfaces made from commercial injection moldable and extrusion grades of polyesters.

The addition of conventional di- and polyepoxides and, more recently, the addition of ethylene copolymers containing glycidyl groups have been suggested for increasing the melt strength and viscosity of polyesters; however such compositions are not suitable for blow molding large objects having smooth surfaces and having complex cross-sections such as automobile parts.

BACKGROUND ART

U.S. Pat. No. 4,659,757, granted Apr. 21, 1987 to Okamoto et al., discloses poly(ethylene terephthalate) (PET) molding compositions yielding impact resistant articles prepared by melt blending PET with 3 to 60 parts of a second polyester selected from the group consisting of (1) copolymers of ethylene glycol, terephthalic acid and aliphatic dicarboxylic acids containing at least 12 carbon atoms (2) copolymers of ethylene glycol, terephthalic acid and a poly(alkylene oxide) glycol, and (3) polyarylates. In addition the compositions must also contain (a) a nucleating agent selected from the group of finely divided inorganic nucleating agents, a metal salt of an organic carboxylic acid and an ionomer, (b) a polyolefin to which has been grafted an olefin having carboxyl or anhydride groups, (c) an olefin copolymer containing units derived from glycidyl (meth)acrylate and optionally units derived from vinyl acetate as a third monomer and (d) an ester-based plasticizer. As claimed, the compositions must contain the second polyester and each of ingredients (a), (b), (c) and (d).

U.S. Pat. No. 4,912,167, granted March 27, 1990 to Deyrup et al and U.S. Pat. No. 4,914,156, granted Apr. 3, 1990 to Howe, disclose compositions which are blow moldable PET or PBT containing an epoxide group-containing copolymer and a source of catalytic metal cations which source could be a small amount of a zinc ionomer, for example. The disclosure includes olefin copolymers and acrylate copolymers containing epoxide groups, but prefers the olefin copolymers. The examples of these patents demonstrate that sodium ionomers are ineffective in providing blow moldability when used at the same concentration at which zinc ionomers are effective.

U.S. Pat. No. 4,783,980, granted Jan. 28, 1988 to Deyrup discloses toughened thermoplastic polyester compositions prepared by melt blending at high shear 3–40 wt % of an ethylene copolymer containing epoxide groups and 10–40 wt % of units derived from a $C_2$–$C_8$ alkyl (meth)acrylate. A variety of optional ingredients may be added including plasticizers, poly(alkylene oxide) segments and crystallization promoters. As crystallization promoters one can use salts of hydrocarbon acids containing 7 to 54 carbon atoms or salts of ionomeric polymers. Example 1 discloses a poly(ethylene terephthalate) composition which contains 3.8% of a sodium ionomer of an ethylene/methacrylic acid copolymer added as a crystallization promoter.

U.S. Pat. No. 4,034,013 granted Jul. 5, 1977 to Lane discloses that the notched impact strength and melt strength of PET and PBT are improved by incorporating small particles of a core-shell polymer wherein the core is a rubbery acrylate copolymer and the shell is a more rigid acrylate or styrene copolymer containing epoxide groups.

Japanese Patent Publication 59-184251, published Oct. 19, 1984 discloses that polyether ester block copolymers (100 parts) derived essentially from terephthalic acid, 1,4-butanediol and a poly(alkylene oxide) glycol when melt blended with 1-25 parts of an ionomer resin and 1-25 parts of an olefin copolymer containing epoxide groups form compositions having sufficiently high melt tension to permit extrusion blow molding. The compositions are further characterized as exhibiting good elastic recovery and softness.

U.S. Pat. No. 4,246,378, granted Jan. 20, 1981 to Kometani et al discloses the addition of ethylene copolymers containing glycidyl groups for increasing the melt strength and viscosity of polyesters.

SUMMARY OF THE INVENTION

The present invention improves upon the melt strengths and melt viscosities of injection molding and extrusion grade polyesters by upgrading and melt blending them with an ethylene copolymer, a methacrylate copolymer and an ionomer. The ionomer in the compositions of the present invention also suppresses lump formation in the extruded parisons and results in extruded parisons with improved smooth surfaces. The compositions of the present invention provide smooth high quality surfaces in both small and large blow molded parts. The compositions are readily processible by extrusion blow molding to make smooth hollow parts such as containers, furniture elements, appliance parts and automotive components.

More specifically, the compositions of the present invention relate to semi-crystalline blow-moldable polyester blends derived from a polyester, an ethylene glycidyl-containing copolymer, a sodium or potassium ionomer and a methyl methacrylate copolymer containing glycidyl units.

Beyond raising the melt strength, the sodium or potassium ionomer mitigates problems that result from the thermal history of the composition. In particular, a polyester composition with a long thermal history or long hold-up time such as encountered by regrinds from the blow molding process will often form lumps in the dropped parison which causes poor surface quality. However, the polyester compositions of the present invention containing the sodium or potassium ionomer demonstrate smooth high quality surfaces in the extrudates and in the finished blow molded articles.

In addition, both the glycidyl-containing ethylene copolymer and the methyl methacrylate copolymer increase the melt strength in the composition. The melt strength is important when dropping the parison and the glycidyl-containing ethylene copolymers increase melt strength. Moreover, the methyl methacrylate copolymer, beyond increasing the melt strength, increases the stiffness or flexural modulus of molded articles. If one were to use only glycidyl-containing ethylene copolymer to raise the melt strength the flexural modulus would be decreased.

DETAILED DESCRIPTION OF THE INVENTION

The present invention relates to semi-crystalline blow moldable polyester compositions which possess high melt strengths and melt viscosities as well as a high quality smooth surface appearance on the blow molded parts.

More specifically, the compositions of the present invention are semi-crystalline blow moldable polyester compositions which comprise melt blends of the following components:

a) 65-92 weight percent of at least one polyester selected from the group consisting of linear poly(ethylene terephthalate) (PET) having an inherent viscosity of at least 0.65 dl/g., branched PET having an inherent viscosity of at least 0.60 dl/g, mixtures of such PET's, poly(butylene terephthalate) (PBT) having an inherent viscosity of at least 0.8 dl/g, and mixtures of such PET's and such PBT's, provided the latter mixtures contain not more than 20 weight percent of PET, b) 4-17 weight percent of at least one ethylene copolymer, (E/X/Y), where E is ethylene at least 50 weight percent, X is glycidyl (meth)acrylate from 2-10 weight percent and Y is from 0-40 weight percent of a moiety derived from $C_1$-$C_6$ alkyl (meth)acrylate, c) 2-10 weight percent of at least one methyl methacrylate copolymer which contains 2-11 weight percent of units derived from glycidyl (meth)acrylate and 0-40 weight percent of units derived from a group consisting of methyl acrylate and $C_2$-$C_6$ alkyl (meth)acrylate, provided that the methyl methacrylate copolymer has an epoxide functionality of at least 2.5, and d) 2-8 weight percent of at least one ionomer obtained by neutralizing with Na+ or K+ at least 40 weight percent of the carboxyl groups in an ethylene copolymer which contains 9-20 weight percent of units derived from (meth)acrylic acid and 0-35 weight percent of units derived from $C_1$-$C_6$ alkyl (meth)acrylate.

The weight percentages given for each of components a), b), c) and d) are based on the total of those components only.

In the above description, and throughout this application, the designation "(meth)acrylate" is meant to include both "acrylate" and "methacrylate".

Optionally, component e), may be added in the amount of 2-6 parts per 100 parts (pph) by weight of the total of components a), b), c) and d) of at least one polyester other than PET, to assist in the processing of compositions based on PET.

Preferred compositions of the present invention are semi-crystalline blow moldable polyester compositions comprising melt blends of, the following components:

a) 72-88 weight percent of at least one polyester selected from the group consisting of linear PET having an inherent viscosity of at least 0.65 dl/g, branched PET having an inherent viscosity of at least 0.60 dl/g, mixtures of such PET's, PBT having an inherent viscosity of at least 0.8 dl/g and mixtures of such PET's and such PBT's, provided the latter mixtures contain not more than 20 weight percent of PET, b) 6-14 weight percent of at least one ethylene copolymer, E/X/Y, where E is ethylene at least 55 weight percent, X is glycidyl methacrylate from 4-10 weight percent and Y is from 10-35 weight percent of at least one moiety derived from $C_1$-$C_6$ alkyl (meth)acrylate, c) 3-8 weight percent of at least one methyl methacrylate copolymer which contains 4-8 weight percent of units derived from glycidyl (meth)acrylate and 0-40 weight percent of units derived from a group consisting of methyl acrylate and $C_2$-$C_6$ alkyl (meth)acrylate, provided that the methyl methacrylate copolymer has an epoxide functionality of at least 3.0, and d) 3-6 weight percent of at least one ionomer obtained by neutralizing with Na+ or K+ at least about 40 percent of the carboxyl groups in an ethylene copolymer which contains about 9-20 weight percent of units derived from (meth)acrylic acid and 0-35 weight percent of units derived from $C_1$-$C_2$ alkyl (meth)acrylate.

Optionally, component e), which is at least one polyester other than PET, may be added in the amount of about 2-4 pph by weight of the total of components a), b), c) and d) to assist in the processing of compositions based on PET.

Component a) is a polyester selected from the group consisting of linear poly(ethylene terephthalate) (PET) having an inherent viscosity of at least 0.65 dl/g, branched PET having an inherent viscosity of at least 0.60 dl/g, mixtures of such PET's, PBT having an inherent viscosity of at least 0.8 dl/g, and mixtures of such PET's and such PBT's, provided the latter mixtures contain not more than 20 weight percent of PET.

Linear PET is a well established commercial product which is normally made by esterification of terephthalic acid with ethylene glycol followed by polycondensation. PET having an inherent viscosity of about 0.65 dl/g may be made by polycondensation in the melt. PET having inherent viscosities of about 1.0 dl/g are usually prepared by subsequent solid phase polycondensation of lower molecular weight PET first prepared by melt condensation. Recycled PET bottle resin represents a source of relatively inexpensive linear PET which with proper recycling of PET bottles will be available in very substantial amounts. The PET used for bottles normally contains a minor amount, about 2% by weight, of a second glycol such as diethylene glycol, the presence of which facilitates the manufacture of oriented PET bottles, and normally has an inherent viscosity of at least 0.65 dl/g and preferably has an inherent viscosity of about 0.7-0.72 dl/g. The presence of the second glycol monomer does not adversely affect the use of recycled PET resin in the present invention.

Branched PET can be made by substantially the same processes as are used for linear PET with the exception that a minor amount of a tri- or higher functionality polyol or polyacid monomer is added to the polymerization. Trifunctional acids are usually preferred and of these, trimellitic anhydride or tri-lower alkyl esters of trimellitic acid are especially preferred. From about 0.2-1.0 mole of trifunctional acid per 100 moles of terephthalic acid can be used with 0.4 to 0.7 moles being preferred. Branched PET has a higher melt viscosity and greater melt strength than does linear PET having the same inherent viscosity. Because of these properties, branched PET having relatively low inherent viscosity is useful in preparing the compositions of this invention. Moreover, the branched PET is less expensive than linear PET prepared by solid phase polycondensation.

Blends of linear and branched PET can also be used to prepare the compositions of this invention. The uses of blends of branched PET with linear PET having a relatively low inherent viscosity yields compositions which are versatile in terms of the size and complexity of the articles which can be blow molded from them. For economic reasons, blends of branched PET with recycled PET bottle resin are of particular interest.

PBT is also a well-known commercial product. It is normally made by transesterification of dimethyl terephthalate with excess 1,4-butanediol followed by polycondensation. It is also possible to start with terephthalic acid and butanediol. In order to obtain resins having inherent viscosities of at least about 0.8 dl/g it is necessary to use a continuous finisher when melt condensation is used exclusively. With batch finishing, melt condensation followed by solid phase condensation is generally required to obtain the desired inherent viscosities.

Blends of PBT with not more than about 20 weight percent of suitable grades of PET are also useful for preparing the compositions of this invention. The use of PET in these amounts lowers the cost of such blends without significantly diminishing the properties associated with unblended PBT. The PET used may be linear or branched or mixtures thereof and should have inherent viscosities that meet or exceed the minimum inherents specified hereinbefore for PET.

Compositions prepared from linear and branched PET and from PBT having inherent viscosities near the minimum values stated above are generally suitable for extrusion blow molding of articles requiring the use of parisons having a length of up to about one foot. To prepare compositions which can be used to form larger parisons, resins having higher inherent viscosities are needed. For linear PET, inherents of at least about 1.0 dl/g are preferred for large articles. For branched PET, inherents of at least 0.65 dl/g are preferred for large objects. For PBT, inherents above about 0.8 dl/g are preferred for preparing compositions to be used for forming large articles.

Component b) is an ethylene copolymer, E/X/Y, where E is ethylene at least 50 weight percent, X is glycidyl (meth)acrylate from 2-10 weight percent and Y is about 0-40 weight percent of at least one $C_1$-$C_6$ alkyl (meth)acrylate. Thus, component b) may be a dipolymer of ethylene and glycidyl (meth)acrylate. More preferred are terpolymers containing up to 40% by weight of units derived from lower alkyl (meth)acrylate esters, of which butyl acrylate is preferred. Most preferred are terpolymers of ethylene containing 10-35 weight percent of butyl acrylate and 4-8 weight percent of glycidyl methacrylate.

Component b) is used in amounts of 4-17 weight percent, and more preferably 6-14 weight percent based on the total weight of components a), b), c) and d). Since components b), c) and d) each contribute to the blow moldability of the instant compositions by increasing melt viscosity, melt strength and die swell, the preferred amount of component b) used within the aforementioned ranges is partly dependent on the levels of components c) and d). The epoxide content of component b) is another factor which affects the preferred amount of component b) used. In general, the greater the epoxide content of component b), the less of component b) will be required. Further information regarding the amounts of component b) to be used is provided in the examples hereinafter.

Component c) is a methyl methacrylate copolymer containing 2-11 weight percent, and preferably 3-8 weight percent of units derived from glycidyl (meth)acrylate. Optionally component c) may contain up to 40 weight percent of units derived from methyl acrylate or $C_2$-$C_6$ alkyl (meth)acrylates. The epoxide functionality of these copolymers should be at least about 2.5 and preferably at least 3.0; that is, each polymer molecule should contain an average of at least 2.5 and preferably at least 3.0 units derived from glycidyl (meth)acrylate. Most preferred are terpolymers containing 3-8 weight percent glycidyl (meth)acrylate and u to 25 weight percent of ethyl acrylate. The required copolymers can be random copolymers obtained by free radical polymerization of mixtures of methyl methacrylate, glycidyl (meth)acrylate and optionally methyl acrylate or other lower alkyl esters of (meth)acrylic acid. Alternatively, the copolymers can be block polymers prepared by sequential polymerization of the desired monomers. These block polymers may be prepared by processes described in U.S. Pat. No. 4,524,196 to Farnham et al. Random copolymers can also be prepared by such processes, but are generally prepared by free radical polymerization as indicated above.

Component c) is used in amounts of 2-10 weight percent and preferably 3-8 weight percent based on the total weight of components a), b), c) and d). As was the case for component b), the preferred amount of component c) used depends in part on the concentration of epoxide groups in component c) and also on the concentration of components b) and d), each of which contributes to the blow moldability of the total composition. Generally, the amount used of the more expensive component c), the methyl methacrylate copolymer, will be less than the amount used of component b), the ethylene copolymer. Representative compositions are presented in the samples hereinafter.

Component d) is an ionomer obtained by neutralizing with Na+ or K+ at least about 40 percent of the carboxyl groups contained in an ethylene copolymer containing about 9-20 weight percent of units derived from (meth)acrylic acid. Optionally these ionomers can contain up to about 35 weight percent of units derived from $C_1$-$C_6$ alkyl (meth)acrylate. A preferred termonomer is n-butyl acrylate. Component d) is used in amounts of 2-8 weight percent, preferably 3-6 weight percent based on the total weight of components a), b), c) and d). Since component d) contributes to the blow moldability of the compositions of this invention, the amount of component d) used depends at least in part on the amounts of components b) and c) present in a given composition. In addition, component d) improves the stability of the molten composition during processing which in turn permits extrusion of smooth parisons.

As noted above, each of components b), c) and d) contributes to the blow moldability of the compositions of this invention. In general, increasing the concentration of any of the three components within the ranges specified will raise the melt viscosity of a given blow molding composition. While blow moldability is more than a function of melt viscosity, for guidance it should be noted that compositions having melt viscosities at about 260° C. for PBT and about 270° C. for PET of at least about 10,000 to 15,000 Pa sec at 1 sec$^{-1}$ are usually suitable for forming articles requiring a parison of up to about 61 cm (2 feet) in length and compositions having melt viscosities at the above temperatures of at least about 20,000 to 30,000 Pa sec at 1 sec$^{-1}$ are usually suitable for forming articles requiring a parison greater than 61 cm in length. As previously suggested, reference to the Samples contained below will assist one in selecting amounts of components b), c) and d) which will yield a composition suitable for a given molding application. The melt rheology of the compositions of the present invention makes them suitable for thermoforming applications.

As stated above, the addition of a minor amount of a polyester, component e), other than branched and/or linear PET may assist in the processing of compositions based on PET. PET samples melting above about 250° C., which is typical for linear PET homopolymer but may also be observed for branched PET on occasion, generally exhibit melt viscosities which diminish rapidly with increasing temperatures in the range used for blow molding. The ratio of melt viscosity at 270° C. to the melt viscosity at 280° C. may be as high as 10 for unmodified linear PET homopolymer. Because of this extreme sensitivity of melt viscosity to temperature, minor fluctuations in temperature on the low side result in excessive torque within the extruder of the blow molding machine while conversely, temperatures on the high side cause the melt to be too fluid to form a stable parison. Such compositions can only be blow molded satisfactorily in equipment where excellent temperature control is possible. By adding a minor amount of a second polyester, such sensitive compositions are converted to materials which can be readily processed in any conventional extrusion blow molding machine. The addition of a second polyester is usually not required, for compositions of the present invention containing substantial amounts of recycled bottle PET because such PET already contains a second monomer which lowers the melting point of the composition and improves processibility.

In essence, any polyester based on a diol other than ethylene glycol and/or based on a diacid other than terephthalic acid can be used to improve the processing of compositions based on PET which exhibit the problems just discussed. Polyesters based on aromatic diacids are preferred because compositions modified with aliphatic polyesters may exhibit decreased hydrolytic stability. Three classes of polyesters have been found to be particularly useful for the modification of high melting PET compositions. They are as follows:

1. Polyesters of $C_3$-$C_{10}$ $\alpha,\omega$-diols and an aromatic dicarboxylic acid;
2. Polyarylates of dihydric phenols and an aromatic dicarboxylic acid, and
3. Copolyetherester block copolymers derived from a low molecular weight diol, a polyether glycol and an aromatic dicarboxylic acid.

The polyesters of class 1 are close relatives of PET and can be prepared substantially by the same condensation procedures used to make PET. $\alpha,\omega$-diols are preferred. Preferred dicarboxylic acids are the three isomeric phthalic acids, but substituted phthalic acids and acid such as 1,5-,2,6- and 1,4-naphthalene dicarboxylic acid are also useful. The preferred polyester of class 1 is PBT.

The polyarylates of class 2 are aromatic polyesters derived from one or more dihydric phenols and one or more aromatic dicarboxylic acids. The dihydric phenol is preferably a bisphenol as described in U.S. Pat. No. 4,187,358 having the structure:

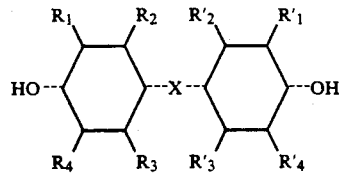

wherein —X— is selected from the group consisting of nothing; i.e., a covalent bond, —O—, —S—, —SO$_2$—, —SO—, —CO—, an alkylene group containing 1 to 5 carbon atoms and an alkylidene group containing 2 to 7 carbon atoms, and $R_1$, $R_2$, $R_3$, $R_4$, $R_{1'}$, $R_{2'}$, $R_{3'}$, and $R_{4'}$, may be the same or different, and each is selected from the group consisting of a hydrogen atom, a chlorine atom, a bromine atom and an alkyl group containing 1 to 5 carbon atoms, and/or a functional derivative thereof. 2,2'-Bis(4-hydroxyphenyl)propane is most preferred.

Additionally, up to 40 mole percent of mononuclear dihydric phenols may be used in combination with the bisphenols. Representative are hydroquinone and resorcinol and substituted derivatives thereof containing one to four substituents selected from the group consisting of chlorine, bromine and lower alkyl.

Preferably, a mixture of 90 to 0 mole percent of terephthalic acid and/or the functional derivatives thereof and 10 to 100 mole percent of isophthalic acid and/or its functional derivatives is used as the acid component to be reacted with the bisphenol to prepare the polyarylate. Preparative methods for polyarylates are described in detail in U.S. Pat. Nos. 3,884,990, 3,946,091, 4,052,481 and 4,485,230.

Preferred polyarylates for use in the compositions of this invention are derived from isophthalic acid optionally containing up to 30 weight percent terephthalic acid and 2,2'-bis(4-hydroxyphenyl)propane.

The copolyetherester block copolymers of class 3 consist essentially of 15-95 weight percent of short chain ester units which are derived from a low molecular weight diol and an aromatic dicarboxylic acid and 5-85 weight percent of long chain ester units which are derived from a poly(alkylene oxide) glycol having a number average molecular weight of 400-6000 and an aromatic dicarboxylic acid. These polymers are readily prepared by substantially the same procedures useful for preparing PET and PBT, with the exception of adding a poly(alkylene oxide) glycol to the reaction mass. Polymers derived from terephthalic acid (optionally containing some isophthalic acid), butanediol and a poly(alkylene oxide) glycol selected from the group consisting of poly(tetramethylene oxide) glycol, poly(1,2-propylene oxide) glycol and ethylene oxide-capped poly(1,2-propylene oxide) glycol are readily available as commercial products.

Of the three classes of polyesters, those of class 1 are preferred with poly(butylene terephthalate) being especially preferred. It should be noted that the polyesters of class 3 which are known to be elastomers reduce the rigidity of the compositions of this invention and are therefore not preferred when compositions exhibiting the highest rigidity are desired.

When PET-based compositions are modified by the addition of a second polyester, the second polyester should be used in amounts of 2–6 pph by weight, preferably 3–5 pph, based on the total weight of components a), b), c) and d). Note that the sum of the percentages of a), b), c) and d) equals 100 weight percent and the amount of the second polyester, being an optional component, is in addition to the weight of the basic composition.

The compositions of the present invention may contain minor amounts of a variety of additives which are frequently used in plastics. Such additives include antioxidants, UV stabilizers, dyes, pigments, flame retardants, fibrillatable fluorocarbons and fillers. The use of reinforcing fillers such as chopped glass fibers and acicular calcium metasilicate permits the preparation of moldings which exhibit exceptional rigidity. Reinforcing fillers may be used in amounts of up to about 40 pph by weight based on the total weight of components a), b), c) and d) which four ingredients total 100%. In other words, up to about 40 parts by weight of filler can be used for 100 parts by weight of components a), b), c) and d). The presence of reinforcing fillers generally raises the melt viscosity of the compositions of this invention. If significant amounts of reinforcing fillers are used it may be necessary to either (1) decrease the amounts within the limits specified herein of components b), c) and d), each of which enhances melt viscosity; or (2) employ a polyester, component a), with a lower melt viscosity. For instance, with 20 pph of acicular calcium silicate, compositions based on branched PET having an inherent viscosity of 0.65 dl/g are so viscous that they overheat in the extruder. This problem may be remedied by replacing most or all of the branched PET with linear PET having an inherent viscosity of about 0.65 to 0.7 dl/g. Because of its potentially low cost, filled compositions based exclusively or largely on recycled bottle PET are of particular interest for molded articles exhibiting exceptional rigidity. The use of branched PET (inherent viscosity of 0.65 dl/g) is highly effective in enhancing the melt strength of blow molding compositions based on recycled bottle resin.

In the following samples the various samples were prepared by melt blending the indicated ingredients, by extrusion in a 28 or 57 mm twin screw extruder.

For Tables IX and XV below the ingredients of the compositions, namely components a), b) and c), were added to the rear of the extruder. For illustration, the feed rates for Sample 15-1 are as follows:

| Component (a): | 52.9 kgs./hr. |
| Component (b): | 7.5 kgs./hr. |
| Component (c): | 2.0 kgs./hr. |

For the remaining Samples in Tables IX and XV, the amounts and proportions of the various components can be calculated from the information in Tables IX and XV.

The ingredients were blended on a Werner and Pfleiderer bilobal twin screw extruder having a diameter of 57 mm and a length to diameter ratio of 37. The screw used was a general purpose screw with vacuum capability consisting of conveying elements to convey the feed material from the feed zone to a melting zone in which the material was compressed and melting begins. A section of "kneading blocks" followed by "reverse elements" next provides high shear and pressure to further the melting and mixing process. The reverse elements serve also to provide a melt seal following which the melt is decompressed in the section under vacuum. Following the vacuum zone, introduced via a side feeder at the rate of 5.4 kg/hour was a mixture obtained by dry blending components e and components d at a ratio of 4.5 to 7.5, respectively. After the side feeder, the screw recompresses the melt and passes it through kneading blocks and reverse elements which also serve as a vacuum seal for a second vacuum zone. Then the melt is recompressed and mixed as it passes through the end of the extruder and out the die.

Representative extrusion conditions for the compositions shown in Table IX are:

| Setting Zone 1 (°C.) | Setting Zone 2 (°C.) | Setting Zone 3 (°C.) | Setting Zone 4 (°C.) | Setting Zone 5 (°C.) | Setting Die (°C.) |
| --- | --- | --- | --- | --- | --- |
| 270 | 270 | 270 | 270 | 270 | 270 |

| Sample | Screw Speed (rpm) | Extru. Rate (Kg/hr) | Melt Temp. (°C.) |
| --- | --- | --- | --- |
| 9 - 1 | 150 | 68.1 | 276 |
| 9 - 2 | 200 | 68.1 | 313 |
| 9 - 3 | 200 | 68.1 | 313 |
| 9 - 4 | 200 | 68.1 | 313 |

Representative extrusion conditions for the compositions shown in Table XV are:

| Setting Zone 1 Temp (°C.) | Setting Zone 2 Temp (°C.) | Setting Zone 3 Temp (°C.) | Setting Zone 4 Temp (°C.) | Setting Zone 5 Temp (°C.) | Setting Die Temp (°C.) |
| --- | --- | --- | --- | --- | --- |
| 270 | 270 | 270 | 270 | 270 | 270 |

| Sample | Screw Speed (rpm) | Extru. Rate Kg/hr | Melt Temp (°C.) |
| --- | --- | --- | --- |
| 15 - 1 | 175 | 68.1 | 335 |
| 15 - 2 | 150 | 68.1 | 325 |
| 15 - 3 | 150 | 68.1 | 324 |
| 15 - 4 | 150 | 68.1 | 325 |
| 15 - 5 | 150 | 68 1 | 314 |

The product was extruded at a rate of 68 kgs/hour through a six hole die. Temperature of the melt exiting the extruder die was measured as the melt temperature. Melt strands exiting the extruder were quenched in water and cut into pellets. The pelletized product was dried at 100°–105° C. in a circulating air drier equipped with dehumidifier.

For Tables VII, VIII and XIV below the ingredients of the compositions were placed in a polyethylene bag and tumbled to mix. The resulting dry blend was melt blended on a Werner and Pflieiderer twin-screw extruder having a diameter of 28 mm and a length to diameter ratio of 27.5. The screw used is a general purpose screw with vacuum capability consisting of conveying elements to convey the feed material from the feed zone to a melting zone in which the material is compressed and melting begins. A section of "kneading blocks" followed by "reverse elements" next provides high shear and pressure to further the melting and mixing processes. The reverse elements serve also to provide a melt seal following which the melt is decompressed in the section under vacuum. Following the vacuum zone, the screw recompresses the melt and passes it through kneading blocks and reverse elements which also serve as a vacuum seal for this side of the vacuum zone. The melt is then further compressed and mixed as it passes through the end of the extruder and out the die.

Representative extrusion conditions for the compositions shown in Table VII and VIII for each sample are:

| Setting Zone 1 (°C.) | Setting Zone 2 (°C.) | Setting Zone 3 (°C.) | Setting Zone 4 (°C.) | Setting Zone 5 (°C.) | Setting Die (°C.) |
|---|---|---|---|---|---|
| 240 | 250 | 260 | 260 | 260 | 260 |

| Sample | Screw Speed (rpm) | Extru. Rate (Kg/hr) | Melt Temp (°C.) |
|---|---|---|---|
| 7 - 1 | 150 | 8.4 | 294 |
| 7 - 2 | 150 | 8.8 | 286 |
| 7 - 3 | 150 | 8.9 | 298 |
| 7 - 4 | 150 | 8.8 | 287 |
| 7 - 5 | 150 | 8.7 | 288 |
| 7 - 6 | 150 | 8.6 | 296 |
| 8 - 1 | 150 | 8.2 | 317 |
| 8 - 2 | 150 | 8.2 | 315 |
| 8 - 3 | 150 | 7.4 | 317 |
| 8 - 4 | 150 | 7.6 | 328 |
| 8 - 5 | 150 | 6.8 | 321 |
| 8 - 6 | 150 | 8.3 | 319 |
| 8 - 7 | 150 | 7.9 | 314 |
| 8 - 8 | 150 | 8.0 | 316 |
| 8 - 9 | 150 | 7.6 | 317 |

Representative extrusion conditions for the compositions shown in Table XIV are:

| Setting Zone 1 (°C.) | Setting Zone 2 (°C.) | Setting Zone 3 (°C.) | Setting Zone 4 (°C.) | Setting Zone 5 (°C.) | Setting Die (°C.) |
|---|---|---|---|---|---|
| 260 | 260 | 260 | 260 | 260 | 260 |

| Sample | Screw Speed (rpm) | Extru. Rate (Kg/hr) | Melt Temp (°C.) |
|---|---|---|---|
| 14 - 1 | 150 | 8.2 | 322 |
| 14 - 2 | 150 | 8.2 | 318 |
| 14 - 3 | 150 | 8.0 | 316 |

For example, Sample 8-1 in Table VIII was extruded at a rate of 8.2 kg/hr at a screw speed of 150 RPM. For the remaining samples in Tables VII, VIII and XIV, the amounts vary and proportions can be calculated from the Tables. Temperature of the melt exiting the extruder was measured and the melt was quenched in water and cut into pellets. The pelletized product was dried in a vacuum oven set at 120° C. and purged with a slight nitrogen sweep overnight. For Sample 8-1, the product had a melt viscosity, measured using a Kayeness viscometer at 260° C. of 61000 Pa sec at 1 sec−1, and 1700 Pa sec at 1000 sec−1.

For Tables X-XIII and XVI and XVII below the ingredients of the compositions were placed in a polyethylene bag and tumbled to mix.

The resulting dry blend was melt blended on a Werner and Pfleiderer twin-screw extruder having a diameter of 28 mm and a length to diameter ratio of 27.5. The screw used is a general purpose screw with vacuum capability consisting of conveying elements to convey the feed materials from the feed zone to a melting zone in which the material is compressed and melting begins. A section of "kneading blocks" followed by "reverse elements" next provides high shear and pressure to further the melting and mixing processes. The reverse elements serve also to provide a melt seal following which the melt is decompressed in the section under vacuum. Following the vacuum zone, the screw recompresses the melt and passes it through kneading blocks and reverse elements which also serve as a vacuum seal for this side of the vacuum zone. The melt is then further compressed and mixed as it passes through the end of the extruder and out the die.

Representative extrusion conditions for the compositions shown in Tables X to XIII and XVII for each sample are:

| Setting Zone 1 (°C.) | Setting Zone 2 (°C.) | Setting Zone 3 (°C.) | Setting Zone 4 (°C.) | Setting Zone 5 (°C.) | Setting Die (°C.) |
|---|---|---|---|---|---|
| 260 | 260 | 260 | 260 | 260 | 260 |

| Sample | Screw Speed (rpm) | Extru. Rate (Kg/hr) | Melt Temp (°C.) |
|---|---|---|---|
| 10-1 | 150 | 9.9 | 303 |
| 10-2 | 150 | 7.9 | 304 |
| 11-1 | 150 | 8.4 | 306 |
| 11-2 | 150 | 8.4 | 302 |
| 11-3 | 150 | 8.1 | 294 |
| 11-4 | 150 | 7.4 | 284 |
| 12-1 | 175 | 10.9 | 285 |
| 12-2 | 175 | 10.5 | 286 |
| 12-3 | 175 | 11.4 | 287 |
| 12-4 | 175 | 10.8 | 287 |
| 13-1 | 175 | 13.6 | 282 |
| 13-2 | 175 | 9.8 | 292 |
| 13-3 | 175 | 9.3 | 295 |
| 13-4 | 175 | 12.1 | 292 |
| 13-5 | 175 | 9.1 | 296 |
| 16-1 | 150 | 8.2 | 301 |
| 16-2 | 150 | 7.6 | 300 |
| 16-3 | 150 | 7.4 | 300 |
| 16-4 | 150 | 7.6 | 306 |
| 17-1 | 150 | 9.2 | 295 |
| 17-2 | 150 | 6.9 | 319 |
| 17-3 | 150 | 6.9 | 318 |
| 17-4 | 150 | 8.8 | 302 |
| 17-5 | 150 | 9.3 | 297 |

Temperatures of the melt exiting the extruder die were measured and reported above. The melt strand exiting the extruder was quenched in water and cut into pellets. The pelletized product was dried in a vacuum oven set at 120° C. and purged with a slight nitrogen sweep overnight. For example, Sample 12-2 had a melt viscosity, measured using a Kayeness viscometer at 270° C. of 42881 Pa sec at 1 sec−1, and 1031 Pa sec at 1000 sec−1.

Some of the dried resins for each extruded sample from Tables VII through XIV were blow molded using a Rocheleau molding machine equipped with a single-screw extruder. The screw had a 1.5 inch diameter, a length to diameter ratio of 20 and a compression ratio of 2 to 1. Samples marked with dashes denote that the particular sample was not blow molded. The resin was blow molded under the following conditions:

Representative blow molding temperature profiles used to produce the blow mold parts that appear on Table VII are:

| Setting Feed Zone (°C.) | Setting Transition Zone (°C.) | Setting Metering Zone (°C.) | Setting Die Zone (°C.) |
|---|---|---|---|
| 260 | 260 | 270 | 265 |

| Sample | Screw Speed (rpm) | Mold Geometry |
|---|---|---|

-continued

| Sample | Screw Speed (rpm) | Mold Geometry |
|---|---|---|
| 7-1 | — | — |
| 7-2 | 88 | Bottle |
| 7-3 | — | — |
| 7-4 | — | — |
| 7-5 | — | — |
| 7-6 | 101 | Bottle |

Representative blow molding conditions and temperature profiles used to produce the blow molded parts that appear in Table VIII are:

| Setting Feed Zone (°C.) | Setting Transition Zone (°C.) | Setting Metering Zone (°C.) | Setting Die Zone (°C.) |
|---|---|---|---|
| 240 | 260 | 265 | 260 |

| Sample | Screw Speed (rpm) | Mold Geometry |
|---|---|---|
| 8-1 | 90 | Bottle |
| 8-2 | — | — |
| 8-3 | 78 | Bottle |
| 8-4 | 105 | Bottle |
| 8-5 | 68 | Bottle |
| 8-6 | 98 | Bottle |
| 8-7 | — | — |
| 8-8 | — | — |
| 8-9 | — | — |

Representative blow molding conditions and temperature profiles used to produce the blow molded parts that appear in Table IX are:

| Setting Feed Zone (°C.) | Setting Transition Zone (°C.) | Setting Metering Zone (°C.) | Setting Die Zone (°C.) |
|---|---|---|---|
| 270 | 270 | 265 | 260 |

| Sample | Screw Speed (rpm) | Mold Geometry |
|---|---|---|
| 9-1 | 60–100 | Bottle |
| 9-2 | 160 | Bottle |
| 9-3 | 85 | Bottle |
| 9-4 | 86 | Bottle |

Blow molded automobile spoilers, were also produced from the compositions of 9-3. The procedure and conditions used for blow molding the spoiler are as follows:

The dried resin product was blow molded using a Sterling blow molding machine equipped with a 8.9 cm diameter barrier type screw with a length to diameter ratio of 24:1 and an accumulator of the first-in-first-out design with a capacity of 6.8 kg. The extruder barrel of the blow molding machine was heated and the temperature regulated at 257° C., 257° C., 254° C., and 254° C. for each of the four temperature zones respectively. The three zones of the accumulator were set at 263° C. The extruder screw was operated at a rate of 30 RPM. The spoiler mold was heated to 93° C.

Representative blow molding and conditions and temperature profiles used to produce the blow molded parts that appear in Table XI are:

| Setting Feed Zone (°C.) | Setting Transition Zone (°C.) | Setting Metering Zone (°C.) | Setting Die Zone (°C.) |
|---|---|---|---|
| 270 | 270 | 265 | 260 |

| Sample | Screw Speed (rpm) | Mold Geometry |
|---|---|---|
| 11-1 | — | — |
| 11-2 | 80 | Bottle |
| 11-3 | 80 | Bottle |
| 11-4 | 78 | Bottle |

Representative blow molding and conditions and temperature profiles used to produce the blow molded parts that appear in Table XII are:

| Setting Feed Zone (°C.) | Setting Transition Zone (°C.) | Setting Metering Zone (°C.) | Setting Die Zone (°C.) |
|---|---|---|---|
| 240 | 250 | 260 | 260 |

| Sample | Screw Speed (rpm) | Mold Geometry |
|---|---|---|
| 12-1 | 50 | Wide Mouth Bottle |
| 12-2 | 50 | Wide Mouth Bottle |
| 12-3 | 50 | Wide Mouth Bottle |
| 12-4 | — | — |

Representative blow molding conditions and temperature profiles used to produce the blow molded parts that appear in Table XIII are:

| Setting Feed Zone (°C.) | Setting Transition Zone (°C.) | Setting Metering Zone (°C.) | Setting Die Zone (°C.) |
|---|---|---|---|
| 260 | 260 | 260 | 250 |

| Sample | Screw Speed (rpm) | Mold Geometry |
|---|---|---|
| 13-1 | 120 | Bottle |
| 13-2 | 55 | Bottle |
| 13-3 | 70 | Bottle |
| 13-4 | 60 | Bottle |
| 13-5 | 40 | Bottle |

Representative blow molding and conditions and temperature profiles used to produce the blow molded parts that appear in Table XIV are:

| Setting Feed Zone (°C.) | Setting Transition Zone (°C.) | Setting Metering Zone (°C.) | Setting Die Zone (°C.) |
|---|---|---|---|
| 250 | 250 | 255 | 250 |

| Sample | Screw Speed (rpm) | Mold Geometry |
|---|---|---|
| 14-1 | 85 | Bottle |
| 14-2 | 172 | Bottle |
| 14-3 | 187 | Bottle |

Representative blow molding conditions and temperature profiles used to produce the blow molded parts that appear in Table XVI are:

| Setting Feed Zone (°C.) | Setting Transition Zone (°C.) | Setting Metering Zone (°C.) | Setting Die Zone (°C.) |
|---|---|---|---|
| 270 | 270 | 265 | 260 |

| Sample | Screw Speed (rpm) | Mold Geometry |
|---|---|---|
| 16-1 | 81 | Bottle |

-continued

| | | |
|---|---|---|
| 16-2 | 67 | Bottle |
| 16-3 | 70 | Bottle |
| 16-4 | 56 | Bottle |

The resins for each Sample in the Tables above were extruded at the designated screw speed through the die to produce a parison. Upon closing the molded, the part is blown with air at about 400 MPa. The blown part is cooled in the mold under pressure and ejected. The mold geometry of the bottles are 22.5 cm high and 7.5 cm diameter; the wide mouth bottles have dimensions of 15 cm high and 8 cm in diameter; and the spoiler has dimensions of 136 cm long, 9 cm wide and 1.5 cm thick.

A number of physical properties were measured for each composition. The notch Izod impact strength was determined according to ASTM D-256 measured at 23° C. Tensile properties (tensile yield strength and elongation) at room temperature were measured by ASTM Procedure D-638. The flexural modulus was measured according to ASTM Procedure D-790. Samples were also tested for melt viscosity. The measurement of melt viscosity is described below:

Blow molding resins were first dried in a vacuum oven at 110° C. overnight. Melt viscosity was measured using a Kayeness Rheometer under the following test conditions:

| | |
|---|---|
| Temperature: | 260° C. for PBT formulations |
| | 270° C. and/or 280° C. for PET formulations |
| Die, Length to diameter ratio: | 20 |
| Die Length: | 15.24 mm |
| Die diameter: | 0.76 mm |
| Piston diameter: | 9.53 mm |
| Piston rate: | 1.52 to 152 mm/minute |

In Table I, the inherent viscosities of PBT or PET were measured at 25° C. according to ASTM Procedure D-2857, "Standard Method for Dilute Solution Viscosity of Polymers". Viscosity was measured using a solution containing 0.5 gm polymer per 100 ml of solution. The solvent used consisted of a mixture of 1 part trifluoroacetic acid and 3 parts methylene chloride by volume. In addition to measuring the melt viscosity as an indicator of the strength of the melt, Table XVI shows the melt strength by measuring the "sag time" on the Rocheleau blow molding machine. The sag time is measured by extruding a 30 cm length parison. Then the extruder screw is stopped and simultaneously a timer is started. The time required for the parison to drop off from the extrusion die is recorded. The longer the sag time the stronger the melt. However, it should be noted, the sag time is a function not only of the strength of the melt but its temperature and the weight of the bottle, listed in Table XVI. The polyesters, ethylene copolymer, methyl methacrylate copolymers, ionomers, and additives used in the Samples are defined in the following Tables (I through VI).

In the following samples, all percentages of component a), b), c), and d) are given by weight. Amounts of component e and all additives are given in parts per 100 parts (pph) by weight of the total of components a), b), c) and d). All values originally obtained in British units have been converted to S.I. units and rounded, where appropriate, and finally blanks in the Tables denote either absence of a particular component or that a particular test was not run.

TABLE I

| Code | Identification of Component (a) Description |
|---|---|
| A = | Polybutylene terephthalate (PBT) homopolymer with a melt index of 6.0–7.5 gm/10 min. by ASTM D1238 (240° C., 2160 gram weight) with an inherent viscosity of 0.93 dl/g. |
| B = | Polyethylene terephthalate (PET) containing 0.5 mole percent trimethyl trimellitate branching agent with an inherent viscosity (IV) of 0.65 dl/g. |
| C = | PET homopolymer with an IV of 0.65 dl/g. |
| D = | PET homopolymer with an IV of 1.0 dl/gm. |
| E = | Recycled bottle resin (PET) containing about 2 weight percent of comonomer and a IV of 0.72 dl/g. |
| F = | PET homopolymer with an IV of 1.05 dl/g. |

TABLE II

| Code | Identification of Component (b) Description |
|---|---|
| A | Terpolymer of ethylene/27% butyl acrylate/5% glycidyl methacrylate |

TABLE III

| | Identification of Component (c) | | | | | | | | |
|---|---|---|---|---|---|---|---|---|---|
| | Composition Wt. % | | | | DTBSP | Tg C | Molecular Weight | | | Epoxide* |
| Code | MMA | nBMA | EA | GMA | (ppm) | Calc. | Mw | Mn | Disp. | Functionality |
| A | 52.5 | 32.5 | — | 10.5 | — | — | 11,000 | — | — | — |
| B | 52.5 | 32.5 | 4.5 | 10.5 | None | 60 | 10,952 | 4,718 | 2.32 | 3.5 |
| C | 52.5 | 32.5 | 4.5 | 10.5 | 2000 | 60 | 10,957 | 4,715 | 2.32 | 3.5 |
| D | 69 | 16 | 4.5 | 10.5 | 2000 | 75 | 12,349 | 4,679 | 2.64 | 3.5 |
| E | 85 | 0 | 4.5 | 10.5 | 2000 | 90 | 12,658 | 5,630 | 2.25 | 4.2 |
| F | 76.8 | 0 | 12.5 | 10.5 | 2000 | 75 | 13,140 | 6,035 | 2.18 | 4.6 |
| G | 67 | 0 | 22.5 | 10.5 | 2000 | 60 | 12,831 | 5,559 | 2.31 | 4.1 |
| H | 88 | 0 | 4.5 | 7.5 | 2000 | 90 | 11,814 | 5,654 | 2.09 | 3.0 |
| I | 69 | 0 | 23.5 | 7.5 | 2000 | 60 | 12,449 | 5,906 | 2.11 | 3.1 |
| L | 88 | 0 | 4.5 | 7.5 | None | 90 | 47,400 | 14,500 | 3.27 | 7.7 |

TABLE III-continued

| | | Identification of Component (c) | | | | | | | | |
|---|---|---|---|---|---|---|---|---|---|---|
| | | Composition Wt. % | | | DTBSP | Tg C | Molecular Weight | | | Epoxide* |
| Code | MMA | nBMA | EA | GMA | (ppm) | Calc. | Mw | Mn | Disp. | Functionality |
| M | 88 | 0 | 4.5 | 7.5 | 2000 | 90 | 42,100 | 16,600 | 2.54 | 8.8 |

*Epoxide Functionality = $\dfrac{Mn \times \% GMA}{142.1 \times 100}$ 142.1 = Molecular Weight of Glycidyl Methacrylate
MMA = Methyl methacrylate
nBMA = n-butyl methacrylate
GMA = Glycidyl methacrylate
EA = Ethyl acrylate
DTBSP = Dithio bis-stearyl propionate, a heat stabilizer added to acrylic copolymer

TABLE IV

| | Identification of Component (d) |
|---|---|
| Code | Description |
| A - | Sodium ionomer derived from ethylene/15% methacrylic acid copolymer (MAA) in which 59% of the acid groups have been converted to the corresponding sodium salt. |
| B - | Sodium ionomer derived from ethylene/10% MMA copolymer in which 75% of the acid groups have been converted to the corresponding sodium salt. |
| C - | Zinc ionomer derived from ethylene/10% MAA copolymer in which 71% of the acid groups have been converted to the corresponding zinc salt. |

TABLE V

| | Identification of Component (e) |
|---|---|
| Code | Description |
| A | A copolymer prepared by ester interchange followed by polycondensation of 4.52 moles of dimethyl terephthalate, 1.32 moles of dimethyl isophthalate, 1.0 mole of polytetramethyleneether glycol (having a number average molecular weight of 980) and excess 1,4-butanediol in the presence of tetrabutyl titanate catalyst. |
| B | PBT homopolymer with a melt index of 6.0–7.5 gm/10 mm by ASTM D-1238 (240° C., 2160 gm weight). |

TABLE VI

| | Identification of Additives |
|---|---|
| Code | |
| A | Bis (2,4-Di-t-butylphenyl) Pentaerythritol diphosphite |
| B | Tetrakis [methylene (3,5-di-ter-butyl 4-hydroxyhydrocinnamate)] methane |
| C | Acicular naturally occuring calcium metasilicate, surface modified. |
| D | Oxidized polyethylene used as a mold release agent. |
| E | Pentaerythritol Tetrastearate, a mold release agent. |

Samples 7-1 through 7-6 in Table VII illustrate the effect of component d), the sodium ionomer, when used in combination with components b) and c). Samples 7-1 through 7-5 are control samples.

Samples 7-1 through 7-5 contain component b) and c) but no ionomer and hence show much lower viscosities than Sample 7-6 which contains component d). During blow molding, Sample 7-2 exhibited poor melt strength. Thin walled bottles were obtained. In contrast, Sample 7-6 yielded heavier walled and rigid bottles.

TABLE VII

Effect of Component d

| Sample | ID Comp (a) | % Comp (a) | ID Comp (b) | % Comp (b) | ID Comp (c) | % Comp (c) | ID Comp (d) | % Comp (d) | ID Comp (e) | % Comp (e) | Additive A (%) | Additive B (%) |
|---|---|---|---|---|---|---|---|---|---|---|---|---|
| *7-1 | A | 88.95 | A | 8.0 | A | 3.0 | A | 0 | — | — | 0.3 | 0.10 |
| *7-2 | A | 87.95 | A | 8.0 | A | 4.0 | A | 0 | — | — | 0.3 | 0.10 |
| *7-3 | A | 88.95 | A | 8.0 | A | 3.0 | A | 0 | — | — | 0.3 | 0.10 |
| *7-4 | A | 86.95 | A | 10.0 | A | 3.0 | A | 0 | — | — | 0.3 | 0.10 |
| *7-5 | A | 85.94 | A | 10.0 | A | 4.0 | A | 0 | — | — | 0.3 | 0.10 |
| 7-6 | A | 88.97 | A | 4.0 | A | 3.0 | A | 4 | — | — | 0.3 | 0.10 |

| Sample | Melt Temp. °C. | RPM | Kg/HR | Viscosity Pa sec @ 1 sec$^{-1}$ | Viscosity Pa sec @ 1000 sec$^{-1}$ | Viscosity Temp °C. measured at |
|---|---|---|---|---|---|---|
| 7-1 | 294 | 150 | 8.4 | 5413 | 647 | 260 |
| 7-2 | 286 | 150 | 8.8 | 13367 | 687 | 260 |
| 7-3 | 298 | 200 | 8.9 | 11668 | 691 | 260 |
| 7-4 | 287 | 150 | 8.8 | 11805 | 803 | 260 |
| 7-5 | 288 | 150 | 8.7 | 18105 | 814 | 260 |
| 7-6 | 296 | 150 | 8.6 | 36517 | 1287 | 260 |

| Sample | Notched IZOD 23° C., J/M | Ten Yd Str (MPa), 23° C., | Max Str (MPa), 23° C., | % Elg at BK 23° C., | Flex Mod (MPa) | Bottle Quality |
|---|---|---|---|---|---|---|
| 7-1 | — | — | — | — | — | — |
| 7-2 | — | — | — | — | — | Thin wall, smooth outside, wavy inside |
| 7-3 | 710 | — | — | — | 2064 | — |

TABLE VII-continued

| | | | Effect of Component d | | | |
|---|---|---|---|---|---|---|
| 7 - 4 | — | — | — | — | — | — |
| 7 - 5 | — | — | — | — | — | — |
| 7 - 6 | 144 | 52 | 45 | 203 | 2381 | Good die swell, thick wall, smooth bottle |

*Control

Samples 8-1 through 8-9 in Table VIII illustrate the compositions of the present invention where component c) is varied.

A variety of methyl methacrylate copolymers are shown to be effective in modifying PBT component a to give high melt strength. The Samples in Table VIII show that the combination of components b), c), and d) are highly effective in producing PBT formulations with high melt viscosity and high melt strength. These Samples in Table VIII with their high melt viscosity would work well for large blow molded articles. The compositions of Table VIII show good melt strength as well as toughness.

Samples 9-1 through 9-4 in Table IX illustrate the PET compositions of the present invention varying the amounts of Components b) and c), and the addition of Component e), the second polyester.

Sample 9-2 contains a lower level of component c) than Sample 9-1 but still sufficient to impart good melt strength.

Samples 9-2, 9-3 and 9-4 show how melt viscosity and flexural modulus can be varied by changing levels of components b). Specifically, higher levels of component b) result in lower stiffness or flexural modulus. The overall trend in Table IX is that if component c) is increased and component b) decreased the flexural modulus increases.

TABLE VIII

Comparison of various methacrylic copolymer, Component (c)

| Sample | ID Comp (a) | % Comp (a) | ID Comp (b) | % Comp (b) | ID Comp (c) | % Comp (c) | ID Comp (d) | % Comp (d) | ID Comp (e) | % Comp (e) | Additive A (%) | Additive B (%) |
|---|---|---|---|---|---|---|---|---|---|---|---|---|
| 8 - 1 | A | 83.93 | A | 8.0 | A | 5.0 | A | 3.0 | — | — | 0.3 | 0.1 |
| 8 - 2 | A | 83.93 | A | 8.0 | B | 5.0 | A | 3.0 | — | — | 0.3 | 0.1 |
| 8 - 3 | A | 83.93 | A | 8.0 | C | 5.0 | A | 3.0 | — | — | 0.3 | 0.1 |
| 8 - 4 | A | 83.93 | A | 8.0 | D | 5.0 | A | 3.0 | — | — | 0.3 | 0.1 |
| 8 - 5 | A | 83.93 | A | 8.0 | E | 5.0 | A | 3.0 | — | — | 0.3 | 0.1 |
| 8 - 6 | A | 83.93 | A | 8.0 | F | 5.0 | A | 3.0 | — | — | 0.3 | 0.1 |
| 8 - 7 | A | 83.93 | A | 8.0 | G | 5.0 | A | 3.0 | — | — | 0.3 | 0.1 |
| 8 - 8 | A | 83.93 | A | 8.0 | H | 5.0 | A | 3.0 | — | — | 0.3 | 0.1 |
| 8 - 9 | A | 83.59 | A | 8.0 | I | 5.0 | A | 3.0 | — | — | 0.3 | 0.1 |

| Sample | Melt Temp. °C. | RPM | kg/HR | Viscosity Pa sec @ 1 sec$^{-1}$ | Viscosity Pa sec @ 1000 sec$^{-1}$ | Viscosity Temp °C. |
|---|---|---|---|---|---|---|
| 8 - 1 | 317 | 150 | 8.2 | 61000 | 1700 | 260 |
| 8 - 2 | 315 | 150 | 8.2 | 90000 | 2400 | 260 |
| 8 - 3 | 317 | 150 | 7.4 | 100000 | 2300 | 260 |
| 8 - 4 | 328 | 150 | 7.6 | 100000 | 2100 | 260 |
| 8 - 5 | 321 | 150 | 6.8 | 70000 | 1600 | 260 |
| 8 - 6 | 319 | 150 | 8.3 | 150000 | 1700 | 260 |
| 8 - 7 | 314 | 150 | 7.9 | 81000 | 2000 | 260 |
| 8 - 8 | 316 | 150 | 8.0 | 60000 | 1800 | 260 |
| 8 - 9 | 317 | 150 | 7.6 | 50000 | 1700 | 260 |

| Sample | Notched IZOD Impact Strength 23° C., J/M | Ten Yd Str (MPa), 23° C. | Max Str (MPa), 23° C. | % Elg at BK 23° C. | Flex Mod (MPa) | Bottle Quality |
|---|---|---|---|---|---|---|
| 8 - 1 | 198 | 50 | 49 | 190 | 2116 | Fine textured surface, thick wall, strong bottle |
| 8 - 2 | 187 | 52 | 51 | 145 | 2198 | — |
| 8 - 3 | 208 | 51 | 50 | 156 | 2207 | Fine textured surface, thick wall, strong bottle |
| 8 - 4 | 1415 | 50 | 48 | 176 | 2181 | Strong bottle, inside surface wavy |
| 8 - 5 | 1452 | 50 | 48 | 186 | 2250 | Good bottle, thick wall, smooth inside and outside |
| 8 - 6 | 1463 | 50 | 48 | 148 | 2164 | Fine textured surface |
| 8 - 7 | 1431 | 50 | 48 | 142 | 2198 | — |
| 8 - 8 | 1484 | 51 | 49 | 199 | 2250 | — |
| 8 - 9 | 1351 | 49 | 44 | 152 | 2269 | — |

TABLE IX

Variations in component (b) and (c) in the presence of a Second Polyester Component (e)

| Sample | ID Comp (a) | % Comp (a) | ID Comp (b) | % Comp (b) | ID Comp (c) | % Comp (c) | ID Comp (d) | % Comp (d) | ID Comp (e) | % Comp (e) | Additive A (%) | Additive B (%) |
|---|---|---|---|---|---|---|---|---|---|---|---|---|
| 9 - 1 | B | 80.33 | A | 8.28 | A | 6.21 | A | 5.18 | A | 3.11 | 0.31 | 0.10 |
| 9 - 2 | B | 80.33 | A | 9.83 | A | 4.65 | A | 5.18 | A | 3.11 | — | 0.10 |
| 9 - 3 | B | 80.33 | A | 11.39 | A | 3.11 | A | 5.18 | A | 3.11 | 0.31 | 0.10 |

TABLE IX-continued

Variations in component (b) and (c) in the presence of a Second Polyester Component (e)

| | ID Comp (a) | % Comp (a) | ID Comp (b) | % Comp (b) | ID Comp (c) | % Comp (c) | ID Comp (d) | % Comp (d) | ID Comp (e) | % Comp (e) | Additive A (%) | Additive B (%) |
|---|---|---|---|---|---|---|---|---|---|---|---|---|
| 9 - 4 | B | 78.26 | A | 13.46 | A | 3.11 | A | 5.18 | A | 3.11 | — | 0.10 |

| Sample | Melt Temp. °C. | RPM | Kg/HR | Viscosity Pa sec @ 1 sec$^{-1}$ | Viscosity Pa sec @ 1000 sec$^{-1}$ | Viscosity Temp °C. |
|---|---|---|---|---|---|---|
| 9 - 1 | 276 | 150 | 68.1 | 62000 | 2000 | 270 |
| 9 - 2 | 313 | 200 | 68.1 | 61538 | 1405 | 270 |
| 9 - 3 | 313 | 200 | 68.1 | 43655 | 1341 | 270 |
| 9 - 4 | 320 | 200 | 68.1 | 52346 | 1346 | 270 |

| Sample | Notched IZOD Impact Strength 23° C., (J/M) | Ten Yd Str (MPa), 23° C. | Max Str (MPa), 23° C. | % Elg at BK 23° C. | Flex Mod (MPa) | Bottle Quality |
|---|---|---|---|---|---|---|
| 9 - 1 | — | — | — | — | — | Thick wall, strong bottle, Coarse surface |
| 9 - 2 | 69 | 56 | 50 | 28 | 2241 | Thick wall, fine gritty surface |
| 9 - 3 | 112 | 53 | 47 | 30 | 2104 | Thick wall, fine gritty surface |
| 9 - 4 | 117 | 52 | 46 | 34 | 2026 | Thick wall, fine gritty surface |

Samples 10-1 and 10-2 in Table X illustrate the use of PBT as the second polyester, component e), in PET compositions.

TABLE X

Use of Polybutylene Terephthalate as Component (e)

| Sample | ID Comp (a) | % Comp (a) | ID Comp (b) | % Comp (b) | ID Comp (c) | % Comp (c) | ID Comp (d) | % Comp (d) | ID Comp (e) | % Comp (e) | Additive A (%) | Additive B (%) |
|---|---|---|---|---|---|---|---|---|---|---|---|---|
| 10 - 1 | B | 88.33 | A | 11.4 | L | 3.1 | A | 5.2 | B | 3.1 | 0.31 | 0.10 |
| 10 - 2 | B | 82.40 | A | 11.4 | L | 3.1 | A | 3.1 | B | 3.1 | 0.31 | 0.10 |

| Sample | Melt Temp. °C. | RPM | Kg/HR | Viscosity Pa sec @ 1 sec$^{-1}$ | Viscosity Pa sec @ 1000 sec$^{-1}$ | Viscosity Temp °C. |
|---|---|---|---|---|---|---|
| 10 - 1 | 303 | 150 | 9.9 | 35028 | 1208 | 270 |
| 10 - 2 | 304 | 150 | 7.9 | 38193 | 1324 | 270 |

Samples 11-1 to 11-4 in Table XI illustrate the effects of branched and recycled bottle resin as PET component a).

Samples 11-1 to 11-2 demonstrate the use of different methyl methacrylate copolymers, component c), in PET compositions based on branched PET. Both compositions based on branched PET show very high melt viscosities when compared with sample 11-3 which is based on recycled linear PET. Sample 11-1 has a much higher melt viscosity than does 11-2 which is related to the higher epoxide content of component c) for type F versus type H.

Sample 11-4 based on 1:1 recycled and branched PET exhibits melt viscosities high enough to be useful in extrusion blow molding large articles.

TABLE XI

Effect of Recycled Component (a)

| Sample | ID Comp (a) | % Comp (a) | ID Comp (b) | % Comp (b) | ID Comp (c) | % Comp (c) | ID Comp (d) | % Comp (d) | ID Comp (e) | % Comp (e) | Additive A (%) | Additive B (%) |
|---|---|---|---|---|---|---|---|---|---|---|---|---|
| 11 - 1 | B | 80.33 | A | 8.3 | F | 6.2 | A | 5.2 | A | 3.1 | 0.31 | 0.10 |
| 11 - 2 | B | 80.33 | A | 8.3 | H | 6.2 | A | 5.2 | A | 3.1 | 0.31 | 0.10 |
| 11 - 3 | E | 80.33 | A | 8.3 | F | 6.2 | A | 5.2 | A | 3.1 | 0.31 | 0.10 |
| 11 - 4* | E/B | 80.33 | A | 8.3 | F | 6.2 | A | 5.2 | A | 3.1 | 0.31 | 0.10 |

| Sample | Melt Temp. °C. | RPM | Kg/HR | Viscosity Pa sec @ 1 sec$^{-1}$ | Viscosity Pa sec @ 1000 sec$^{-1}$ | Viscosity Temp °C. |
|---|---|---|---|---|---|---|
| 11 - 1 | 306 | 150 | 8.4 | 180000 | 2400 | 270 |
| 11 - 2 | 302 | 150 | 8.4 | 70000 | 1800 | 270 |
| 11 - 3 | 294 | 150 | 8.1 | 10756 | 558 | 270 |
| 11 - 4 | 284 | 150 | 7.4 | 40996 | 1135 | 270 |

| Sample | Notched IZOD Impact Strength 23° C., J/M | Ten Yd Str (MPa), 23° C. | Max Str (MPa), 23° C. | % Elg at BK 23° C. | Flex Mod (MPa) | Bottle Quality |
|---|---|---|---|---|---|---|
| 11 - 1 | 53 | 63 | 62 | 20 | 2712 | — |
| 11 - 2 | 64 | 62 | 57 | 18 | 2550 | Good melt strength and die swell, fine gritty surface |
| 11 - 3 | 64 | 54 | 52 | 18 | 2096 | Inside surface coarse, modest melt strength |
| 11 - 4 | 53 | 60 | 53 | 18 | 2523 | Good melt strength, coarse inside surface |

*A mixture of Codes E & B were used in 40.17% of each for Component (a)

Samples 12-1 to 12-4 in Table XII illustrate the effects of mixtures of recycled PET and branched PET in a mineral filled composition.

The Samples in Table XII contain relatively high levels of component b) with little or no component c). All Samples contain a mineral filler, Additive C. Compare Samples 12-1 to 12-2. Sample 12-1 is a control Sample in which component c) is absent. Sample 12-1 shows a lower flexural modulus than Sample 12-2 because in the absence of component c), a higher level of component b) is needed to achieve the desired high melt strength. Compare Sample 12-3 and 12-4, 12-3 being a control. Again, an increase in flexural modulus can be seen when component c) is used in Sample 12-4 in conjunction with a lower level of component b).

Furthermore, when comparing Samples 12-1 and 12-2 to 12-3 and 12-4, it can be seen that Samples 12-3 and 12-4 both of which contain 50 percent recycled PET give higher melt viscosity than Samples 12-1 and 12-2 which both contain 80 percent recycled PET.

Sample 13-3 contains no component c) and has an increased level of component b) compared to 13-1. The flexural modulus is significantly lower than Sample 13-1, which contains component c) and has a lower level of component b).

Samples 13-4 and 13-5 contain no component e), the second polyester. The notched Izod impact strength is much lower for these samples as compared to Sample 13-1, 13-2 and 13-3 which contain a copolyetherester elastomer as component e).

TABLE XIII

Effects of Component (c) on PET Blow Molding Compositions

| Sample | ID Comp (a) | % Comp (a) | ID Comp (b) | % Comp (b) | ID Comp (c) | % Comp (c) | ID Comp (d) | % Comp (d) | ID Comp (e) | % Comp (e) | Additive A (%) | Additive B (%) |
|---|---|---|---|---|---|---|---|---|---|---|---|---|
| 13-1 | B | 80.33 | A | 11.4 | L | 3.1 | A | 5.2 | A | 3.1 | 0.3 | 0.1 |
| *13-2 | B | 83.44 | A | 11.4 | — | — | A | 5.2 | A | 3.1 | 0.3 | 0.1 |
| *13-2 | B | 76.19 | A | 18.6 | — | — | A | 5.2 | A | 3.1 | 0.3 | 0.1 |
| 13-4 | B | 83.44 | A | 11.4 | L | 3.1 | A | 5.2 | — | — | 0.3 | 0.3 |
| 13-5 | F | 83.44 | A | 11.4 | L | 3.1 | A | 5.2 | — | — | 0.3 | 0.3 |

| Sample | Viscosity Pa sec @ 1 sec$^{-1}$ | Viscosity Pa sec @ 1000 sec$^{-1}$ | Viscosity Temp °C. | Flex Mod (MPa) | Notched IZOD 23° C., J/M | Bottle Quality |
|---|---|---|---|---|---|---|
| 13-1 | 17466 | 1065 | 270 | 1958 | 609 | Good die swell, good bottle, smooth inside and outside |
| 13-2 | 12449 | 843 | 270 | 1820 | 1153 | Same as above, except melt strength is lower |
| 13-3 | 23383 | 972 | 270 | 1462 | 1196 | Modest melt strength, somewhat gritty inside surface |
| 13-4 | 24189 | 1071 | 270 | 2069 | 128 | Good thick walled bottle |
| 13-5 | 28327 | 1014 | 270 | 1889 | 171 | Thick walled bottle, very slight lumps inside surface |

*Control

Samples 14-1 to 14-3 illustrate the effect of zinc and sodium ionomers in PBT compositions of the present invention. Compare Sample 14-1 to Control Samples

TABLE XII

Effects of Recycled PET in a Mineral Filled Composition

| Sample | ID Comp (a) | % Comp (a) | ID Comp (b) | % Comp (b) | ID Comp (c) | % Comp (c) | ID Comp (d) | % Comp (d) | ID Comp (e) | % Comp (e) |
|---|---|---|---|---|---|---|---|---|---|---|
| *12-1 | E/B | 60.94/15.22 | A | 18.66 | — | — | A | 5.18 | A | 3.11 |
| 12-2 | E/B | 60.94/15.22 | A | 15.54 | E | 3.1 | A | 5.1 | A | 3.11 |
| *12-3 | E/B | 38.09/38.09 | A | 18.65 | — | — | A | 5.18 | A | 3.11 |
| 12-4 | E/B | 38.19/38.19 | A | 15.30 | E | 3.1 | A | 5.18 | A | 3.11 |

| Sample | Additive A (%) | Additive B (%) | Additive C (%) | Additive E (%) | Melt Temp. °C. | RPM | Viscosity Pa sec @ 1 sec$^{-1}$ | Viscosity Pa sec @ 1000 sec$^{-1}$ |
|---|---|---|---|---|---|---|---|---|
| 12-1 | 0.4 | 0.1 | 25.87 | 0.5 | 285 | 175 | 40623 | 903 |
| 12-2 | 0.4 | 0.1 | 25.97 | 0.5 | 286 | 175 | 42881 | 1031 |
| 12-3 | 0.4 | 0.1 | 25.97 | 0.5 | 287 | 175 | 62653 | 1321 |
| 12-4 | 0.4 | 0.1 | 26.04 | 0.5 | 287 | 175 | 100000 | 2400 |

| Sample | Viscosity Temp °C. | Notched IZOD 23° C., J/M | Ten Yd Str (MPa), 23° C. | % Elg at BK 23° C. | Flex Mod (MPa) | Bottle Quality |
|---|---|---|---|---|---|---|
| 12-1 | 270 | 91 | 42 | 12 | 2400 | — |
| 12-2 | 270 | 64 | 52 | 11 | 3389 | Good thick walled bottle |
| 12-3 | 270 | 96 | 45 | 14 | 2714 | Very good thick walled bottle |
| 12-4 | 270 | 85 | 54 | 13 | 3501 | — |

*Control

Samples 13-1 to 13-5 illustrate effect of component c) in the compositions of the present invention. In addition, the effect of the component e) is also shown. Compare Sample 13-1 to 13-2 (a control Sample). Sample 13-2 which contains no methyl methacrylate copolymer, component c), has a lower melt viscosity and flexural modulus.

14-2 and 14-3. Sample 14-1 which contains 5% sodium ionomer, component d), gives a product with a high melt viscosity while Sample 14-3 which contains 5% zinc ionomer component d) gives a low melt viscosity. Sample 14-2 containing 0.5% zinc ionomer has a lower melt viscosity than Sample 14-1, however, Sample 14-2 has a higher melt viscosity than Sample 14-3.

TABLE XIV

Effect of Zinc + Sodium Ions in Component (d) in PBT Blow Molding Compositions

| ID Comp | % Comp | ID Comp | % Comp | ID Comp | % Comp | ID Comp | % Comp | Additive | Viscosity Pa sec @ | Viscosity Pa sec @ | Parison Drop Time |

TABLE XIV-continued

Effect of Zinc + Sodium Ions in Component (d) in PBT Blow Molding Compositions

| Sample | a | a | b | b | c | c | d | d | B (%) | 1 sec$^{-1}$ | 1000 sec$^{-1}$ | (sec) |
|---|---|---|---|---|---|---|---|---|---|---|---|---|
| 14-1 | A | 84.0 | A | 8.0 | M | 3.0 | A | 5.0 | 0.2 | 59825 | 1274 | No drop |
| *14-2 | A | 88.5 | A | 8.0 | M | 3.0 | C | 0.5 | 0.2 | 11000 | 650 | 6.8 |
| *14-3 | A | 84.0 | A | 8.0 | M | 3.0 | C | 5.0 | 0.2 | 900 | 600 | 6.8 |

| Sample | Bottle Quality |
|---|---|
| 14-1 | Excellent melt strength and die swell, bottle smooth inside and outside |
| 14-2 | Lower melt strength and die swell, lumps on inside and outside due to no sodium ionomer |
| 14-3 | Lower melt strength and die swell, lumps on inside and outside due to no sodium ionomer |

*Control

Sample 15-1 to 15-5 illustrate the effect higher molecular weight component c) and the effect of changing component e).

Furthermore, Samples 15-1 and 15-2 contain 3 percent of a second polyester block copolymer component which are more impact resistant than Samples 15-3 to 15-5 which contain 3 percent of component e), which is PBT. Samples 15-3 to 15-5 which contain the PBT second polyester are stiffer than Samples 15-1 and 15-2.

TABLE XV

Effect of Higher Molecular Weight Component (c) and Effect of Varying Component (e)

| Sample | ID Comp (a) | % Comp (a) | ID Comp (b) | % Comp (b) | ID Comp (c) | % Comp (c) |
|---|---|---|---|---|---|---|
| 15-1 | B | 80.33 | A | 11.38 | L | 3.11 |
| 15-2 | B | 81.36 | A | 11.38 | L | 3.11 |
| 15-3 | B | 79.29 | A | 12.42 | M | 3.11 |
| 15-4 | B | 80.33 | A | 12.42 | M | 3.11 |
| 15-5 | B/E* | 80.33 | A | 12.42 | L/M | 3.10 |

| Sample | ID Comp (d) | % Comp (d) | ID Comp (e) | % Comp (e) | Additive A(%) | Additive B(%) |
|---|---|---|---|---|---|---|
| 15-1 | A | 5.18 | A | 3.11 | — | 0.2 |
| 15-2 | A | 4.14 | A | 3.11 | — | 0.2 |
| 15-3 | A | 5.18 | B | 3.11 | — | 0.2 |
| 15-4 | A | 4.14 | B | 3.11 | 0.3 | 0.1 |
| 15-5 | A | 4.14 | B | 3.11 | — | 0.2 |

| Sample | Melt Temp °C. | RPM | kg/hr | Viscosity Pa sec @ 1 sec$^{-1}$ | Viscosity Pa sec @ 1000 sec$^{-1}$ | Viscosity Temp °C. |
|---|---|---|---|---|---|---|
| 15-1 | 335 | 175 | 68.1 | 27971 | 1024 | 270 |
| 15-2 | 325 | 150 | 68.1 | 25862 | 1058 | 270 |
| 15-3 | 324 | 150 | 68.1 | 66000 | 1200 | 270 |
| 15-4 | 325 | 150 | 68.1 | 34049 | 1104 | 270 |
| 15-5 | 314 | 150 | 68.1 | 19730 | 976 | 270 |

| Sample | Notched IZOD 23° J/M | Flex Mod (MPa) |
|---|---|---|
| 15-1 | 924 | 2056 |
| 15-2 | 988 | 2111 |
| 15-3 | 246 | 2160 |
| 15-4 | 347 | 2312 |
| 15-5 | — | — |

*1:1 ratio

Sample 16-1 to 16-4 illustrate the role of component e) and component c) in PET compositions of the present invention. Compare Samples 16-1 to 16-4, Samples 16-1 contains no second polyester, component e), and shows good melt strength and stiffness and was blow molded to yield attractive bottles; and Sample 16-4, which contains the second polyester yielded attractive blow molded bottles which were improved over the bottles of Sample 16-1 in that the inside surface of the bottles were smoother.

Samples 16-2 and 16-3 illustrate the effect of omitting component c) from the formulation of the present invention. Sample 16-2 contains the same level of component b) as Sample 16-1 but no component c). As a result, its melt strength is significantly lower than that of Sample 16-1, as can be seen from its lower melt viscosity compared to Sample 16-1. Also, Sample 16-2 has sag time less than half of the sag time observed for Sample 16-1. Sample 16-3 has an increased level of component b) compared to Sample 16-1 in order to enhance the melt strength. The melt strength of Sample 16-3 is good, although still below that of Sample 16-1. More significantly, as a result of the increased level of component b), the flexural modulus is substantially lower than Samples 16-1. The comparison of Samples 16-1 to 16-3 illustrates the advantage of using a combination of components b) and c) of the present invention to achieve good melt strength and high modulus.

TABLE XVI

Role of Component (c) in PET Blow Molding Compositions

| Sample | ID Comp (a) | % Comp (a) | ID Comp (b) | % Comp (b) | ID Comp (c) | % Comp (c) | ID Comp (d) | % Comp (d) | ID Comp (e) | % Comp (e) |
|---|---|---|---|---|---|---|---|---|---|---|
| 16-1 | B | 80.9 | A | 11 | M | 3.0 | A | 5 | — | — |
| *16-2 | B | 84.0 | A | 11 | M | — | A | 5 | — | — |
| *16-3 | B | 76.9 | A | 18 | M | — | A | 5 | — | — |
| 16-4 | B | 80.4 | A | 11 | M | 3.0 | A | 5 | B | 3.0 |

| Sample | Additive B(%) | Kg/hr | Melt Temp °C. | RPM | Viscosity Pa sec @1 sec$^{-1}$ |
|---|---|---|---|---|---|
| 16-1 | 0.3 | 8.2 | 301 | 150 | 49750 |
| 16-2 | 0.3 | 7.6 | 300 | 150 | 22036 |
| 16-3 | 0.3 | 7.4 | 300 | 150 | 35891 |
| 16-4 | 0.3 | 7.6 | 306 | 150 | 39388 |

| Sample | Viscosity Pa sec @1000 sec$^{-1}$ | Viscosity Temp °C. | Flex Modulus (MPa) | Sag (sec) | Wt Bottle (gms) |
|---|---|---|---|---|---|

TABLE XVI-continued

Role of Component (c) in PET Blow Molding Compositions

| | | | | | |
|---|---|---|---|---|---|
| 16 - 1 | 659 | 270 | 2208 | 15 | 51.1 |
| 16 - 2 | 587 | 270 | 2120 | 5.8 | 38.5 |
| 16 - 3 | 664 | 270 | 1743 | 11 | 38.6 |
| 16 - 4 | 732 | 270 | 2220 | 31 | 45.5 |

| Sample | Bottle Quality |
|---|---|
| 16 - 1 | Smooth on outside, grainy texture on inside |
| 16 - 2 | Smooth inside and outside |
| 16 - 3 | Smooth inside and outside |
| 16 - 4 | Smooth inside and outside |

*Control

Samples 17-1 to 17-5 illustrate the role of component e) and component c) in PET blow molding compositions of the present invention. Samples 17-1 and 17-2 are control Samples for comparison with Samples 17-3. Samples 17-1 and 17-2 contain branched and linear PET, respectively and illustrate that either type of PET, component a), can be used to prepare blow molding compositions of the present invention. Sample 17-3 contains the same components as Sample 17-2 but in addition contains 3% of component e), the second polyester. The melt viscosity of the resultant product for Sample 17-3 exhibits a lower sensitivity to temperature compared to Sample 17-2.

Sample 17-4 differs from 17-1 in that component c) is omitted (17-1 is a control Sample). At the same time the level of component b) is increased in order to maintain the melt strength. However, since component b) is a flexible rubbery material, its use at an increased level of component b) causes the flexural modulus to decrease to 1744 MPa from 2076 MPa for Sample 17-1.

TABLE XVII

PET Blow Molding Resins- Role of Component (c) and Component (e)

| Sample | ID Comp (a) | % Comp (a) | ID Comp (b) | % Comp (b) | ID Comp (c) |
|---|---|---|---|---|---|
| 17 - 1 | B | 79.9 | A | 12.0 | M |
|  | B | 79.9 | A | 12.0 | M |
| 17 - 2 | F | 79.9 | A | 12.0 | M |
|  | F | 79.9 | A | 12.0 | M |
| 17 - 3 | F | 79.3 | A | 12.4 | M |
|  | F | 79.3 | A | 12.4 | M |
| *17 - 4 | B | 79.9 | A | 18.0 | — |
|  | B | 79.9 | A | 18.0 | — |
| 17 - 5 | B | 79.8 | A | 12.1 | M |
|  | B | 79.8 | A | 12.1 | M |

| Sample | % Comp (c) | ID Comp (d) | % Comp (d) | ID Comp (e) | % Comp (e) | Additive B (%) | Additive D (%) |
|---|---|---|---|---|---|---|---|
| 17 - 1 | 3.0 | A | 5.0 | — | — | 0.3 | — |
|  | 3.0 | A | 5.0 | — | — | 0.3 | — |
| 17 - 2 | 3.0 | A | 5.0 | — | — | 0.3 | — |
|  | 3.0 | A | 5.0 | — | — | 0.3 | — |
| 17 - 3 | 3.1 | A | 5.2 | B | 3.1 | 0.3 | — |
|  | 3.1 | A | 5.2 | B | 3.1 | 0.3 | — |
| 17 - 4 | — | — | 5.0 | — | — | 0.3 | — |
|  | — | — | 5.0 | — | — | 0.3 | — |
| 17 - 5 | 3.0 | A | 5.0 | — | — | 0.3 | 0.5 |
|  | 3.0 | A | 5.0 | — | — | 0.3 | 0.5 |

| Sample | Viscosity Pa sec @1 sec$^{-1}$ 270° C. | Viscosity Pa sec @1 sec$^{-1}$ 280° C. | Viscosity Pa sec @1000 sec$^{-1}$ 270° C. | Viscosity Pa sec @1000 sec$^{-1}$ 280° C. | Flex Mod (MPa) (280° C.) | Kg/hr |
|---|---|---|---|---|---|---|
| 17 - A | 36161 | 16799 | 971 | 725 | 2076 | 9.2 |
| 17 - B | — | 13219 | 1030 | 898 | 1924 | 6.9 |
| 17 - C | — | 12551 | 1010 | 846 | 1922 | 6.9 |
| 17 - D | — | 17294 | 855 | 706 | 1743 | 8.8 |
| 17 - E | — | 20404 | 1030 | 758 | 2076 | 9.3 |

*Control

I claim:

1. A semi-crystalline extrusion blow-moldable polyester composition which comprises a melt blend of
   a) 65-92 weight percent of at least one polyester selected from the group consisting of linear poly(ethylene terephthalate) PET having an inherent viscosity of at least 0.65 dl/g, branched PET having an inherent viscosity of at least 0.60 dl/g, mixtures of such PET's, poly(butylene terephthalate) having an inherent viscosity of at least 0.8 dl/g and mixtures of such PET's and PBT's, provided the latter mixtures contain no more than 20 weight percent PET,
   b) 4-17 weight percent of at least one ethylene copolymer, E/X/Y, where E is ethylene at least 50 weight percent, X is glycidyl methacrylate from 2-10 weight percent and Y is from 0-40 weight percent of a moiety derived form $C_1$-$C_6$ alkyl(meth)acrylate,
   c) 2-10 weight percent of at least one methyl methacrylate copolymer which contains 49-98 weight percent of units derived from methyl methacrylate, 2-11 weight percent of units derived from glycidyl(meth)acrylate and 0-40 weight percent of units derived from a group consisting of methyl acrylate and $C_2$-$C_6$ alkyl(meth)acrylate, provided that the methyl methacrylate copolymer has an epoxide functionality of at least 2.5, and
   d) 2-8 weight percent of at least one ionomer obtained by neutralizing with Na+ or K+ at least 40 percent of the carboxyl groups in an ethylene copolymer which contains about 9-20 weight percent of units derived form (meth)acrylic acid and 0-35 weight percent of units derived from $C_1$-$C_6$ alkyl (meth)acrylate,
   with the weight percentages of components a), b), c) and d) being based on the total of those components only.

2. The composition of claim 1 wherein component a) is selected from linear PET, branched PET and mixtures of such PET's.

3. The composition of claim 2 containing a further component e), which is at least one polyester other than PET, and which is present in the composition in the amount of about 2.0-6.0 parts per 100 parts by weight of the total of components a), b), c) and d).

4. The composition of claim 2 wherein component a) is selected from branched PET and mixtures of linear PET and branched PET.

5. The composition of claim 1 wherein component a) is selected from PBT and mixtures of PET and PBT.

6. The composition of claim 5 wherein component a) is PBT.

7. The composition of claim 1 wherein the linear PET is recycled bottle PET having an inherent viscosity of at least 0.65 dl/g.

8. The composition of claim 2 wherein component a) is selected from mixtures of branched PET and recycled bottle PET.

9. The composition of claim 1 wherein component a) is present in an amount of 72-88 weight percent, component b) is present in an amount of 6-14 weight percent, component c) is present in an amount of 3-8 weight percent, and component d) is present in an amount of 3-6 weight percent.

10. The composition of claim 3 wherein component e) is present in an amount of 2-4 parts per 100 parts by weight.

11. The composition of claim 9 wherein component b) is an ethylene terpolymer.

12. The composition of claim 11 wherein component b) is an ethylene terpolymer, where E is ethylene at least 55 weight percent, X is glycidyl methacrylate from 4-10 weight percent and Y is from 10-35 weight percent of at least one moiety derived from $C_1$-$C_6$ alkyl (meth)acrylate.

13. The composition of claim 12 wherein component b) contains 4-8 weight percent glycidyl methacrylate and 10-35 weight percent butyl acrylate.

14. The composition of claim 2 wherein component c) contains 4-8 weight percent of units derived from glycidyl (meth)acrylate.

15. The composition of claim 1 wherein the epoxide functionality of component c) is at least 3.0.

16. The composition of claim 1 wherein component c) is methyl methacrylate terpolymer containing 3-8 weight percent glycidyl (meth)acrylate and up to 25 weight percent of ethyl acrylate.

17. The composition of claim 1 wherein component c) is a block copolymer.

18. The composition of claim 1 wherein component d) is obtained by neutralizing with Na+.

19. The composition of claim 3 wherein component e) is selected from polyesters derived from $C_3$-$C_{10}$ $\alpha,\omega$ diols and aromatic dicarboxylic acids and copolyether-ester block copolymers.

20. The composition of claim 19 wherein component e) is a polyester derived from $C_3$-$C_{10}$ $\alpha,\omega$ diols and aromatic dicarboxylic acids.

21. The composition of claim 20 wherein component e) is PBT.

22. The composition of claim 1 which additionally contains up to 40 parts of at least one filler per 100 parts by weight of components a), b), c) and d).

23. The composition of claim 22 wherein the filler is selected from chopped glass and acicular calcium metasiliate.

* * * * *